US006938113B2

United States Patent
Stuber et al.

(10) Patent No.: US 6,938,113 B2
(45) Date of Patent: Aug. 30, 2005

(54) APPARATUS FOR FLUSHING SLAVE TRANSACTIONS FROM RESETTING MASTERS OF A DATA BUS

(75) Inventors: Russell B. Stuber, Boulder, CO (US); Robert W. Moss, Longmont, CO (US); Alan R. Gilchrist, Danville, CA (US)

(73) Assignee: LSI Logic Corporation, Milpitas, CA (US)

( * ) Notice: Subject to any disclaimer, the term of this patent is extended or adjusted under 35 U.S.C. 154(b) by 464 days.

(21) Appl. No.: 10/152,265

(22) Filed: May 20, 2002

(65) Prior Publication Data

US 2003/0217209 A1 Nov. 20, 2003

(51) Int. Cl.[7] .............................................. G06F 13/42
(52) U.S. Cl. ....................... 710/110; 710/35; 709/208
(58) Field of Search ........................... 710/110; 709/208

(56) References Cited

U.S. PATENT DOCUMENTS 4,771,382 A * 9/1988 Shiono et al. ................ 705/21
5,132,680 A * 7/1992 Tezuka et al. ............. 340/3.51
6,292,764 B1 * 9/2001 Avery et al. ................. 703/14
2002/0049822 A1 * 4/2002 Burkhardt et al. .......... 709/208

OTHER PUBLICATIONS

"AMBA™ Specification (Rev. 2.0)", ARM Limited, Cambridge, England, pp. ii–vi and 3–1–3–58 (May 13, 1999).

* cited by examiner

Primary Examiner—Tim Vo
(74) Attorney, Agent, or Firm—Westman, Champlin & Kelly

(57) ABSTRACT

When a master device resets, flush commands are issued to a flush master register in the slave devices. A comparator compares the identification of the master device associated with the flush command to an identification of the master device associated with data for return by the slave device. A gate is responsive to the comparator to flush data from the data register that are pending for return.

12 Claims, 2 Drawing Sheets

APPARATUS FOR FLUSHING SLAVE TRANSACTIONS FROM RESETTING MASTERS OF A DATA BUS

FIELD OF THE INVENTION

This invention relates to data buses, and particularly to controls for data buses used in integrated circuit chips and the like.

BACKGROUND OF THE INVENTION

Data buses are used in integrated circuits (ICs) to transfer data between master devices, such as user-controlled microprocessors, and slave devices that control peripheral devices, such as a memories or the like. To avoid overlapping data messages that may lead to error in data transmission between the master and slave devices, it is common to employ an arbiter to arbitrate message traffic on the bus. One such bus design is an Advanced High-performance Bus (AHB) from ARM Limited of Cambridge, England. The AHB bus design is a form of an Advanced Microcontroller Bus Architecture (AMBA) bus. The AHB bus provides high performance, high clock frequency data transfer between multiple bus master devices and multiple bus slave devices through use of an arbiter. The AHB bus is particularly useful in integrated circuit chips, including single chip processors, to couple processors to on-chip memories and to off-chip external memory interfaces.

Data buses, including the AHB bus, are used to perform write and read transactions. A master device may issue a write command to store data in a memory coupled to a slave device and may issue a read command to read stored data from the slave device. In a write transaction, a write command is received by the slave device. When the slave device is ready to receive and store data, it notifies the master device, which transmits data to the slave device for storage in the associated peripheral device. In a read transaction, a read command is received by the slave device, which retrieves data from the peripheral device. The data returned from peripheral include an identification, or tag, of the requesting master device. When the data are retrieved to a data FIFO register, the slave device notifies the master device it is ready to transfer the data. The data are thereafter transmitted to the master device via the data bus.

If the master device locks up, it is necessary to reset that master device. If a slave device has an outstanding transaction that requires a return of data to the locked-up master device, it is also necessary to purge the slave device of the transaction. This affects read transactions and the like where data are to be returned from the slave's data FIFO. (Write transactions are not ordinarily affected by a master device lock-up because once the data are transferred to the slave data FIFO for storage, the master device's function is effectively completed, so it's lock-up will not materially affect the transaction.)

In prior data buses, purging the transaction from the slave device was usually accomplished by resetting the entire bus system. Resetting the entire system requires more time than simply resetting the afflicted device, and often resulted in loss of debug states, requiring repeating the entire debug procedure.

SUMMARY OF THE INVENTION

The present invention is directed to a master flush technique whereby a slave device can flush data being read for a master device when the master device is in a reset mode. Consequently, only the resetting master device is reset, and there is no need to reset the entire data bus system or other unaffected master or slave devices.

The apparatus flushes data from a slave device intended for return to a reset master device in response to a flush command from that master device. In one embodiment of the invention, a comparator compares an identification of the master device issuing the flush command to an identification of the master device associated with data for return by the slave device. A gate is responsive to the comparator to operate the slave device to flush data pending for return.

In preferred embodiments of the invention an input register stores the master device identification and a flush command from a reset control initiating a flush operation. A return command register stores the identification of the master device associated with data assembled for return to the master device in response to a command. The comparator is responsive to the input register and return command register to operate the slave device's data register to flush data from the data register.

DETAILED DESCRIPTION OF THE PREFERRED EMBODIMENTS

Figure 1:
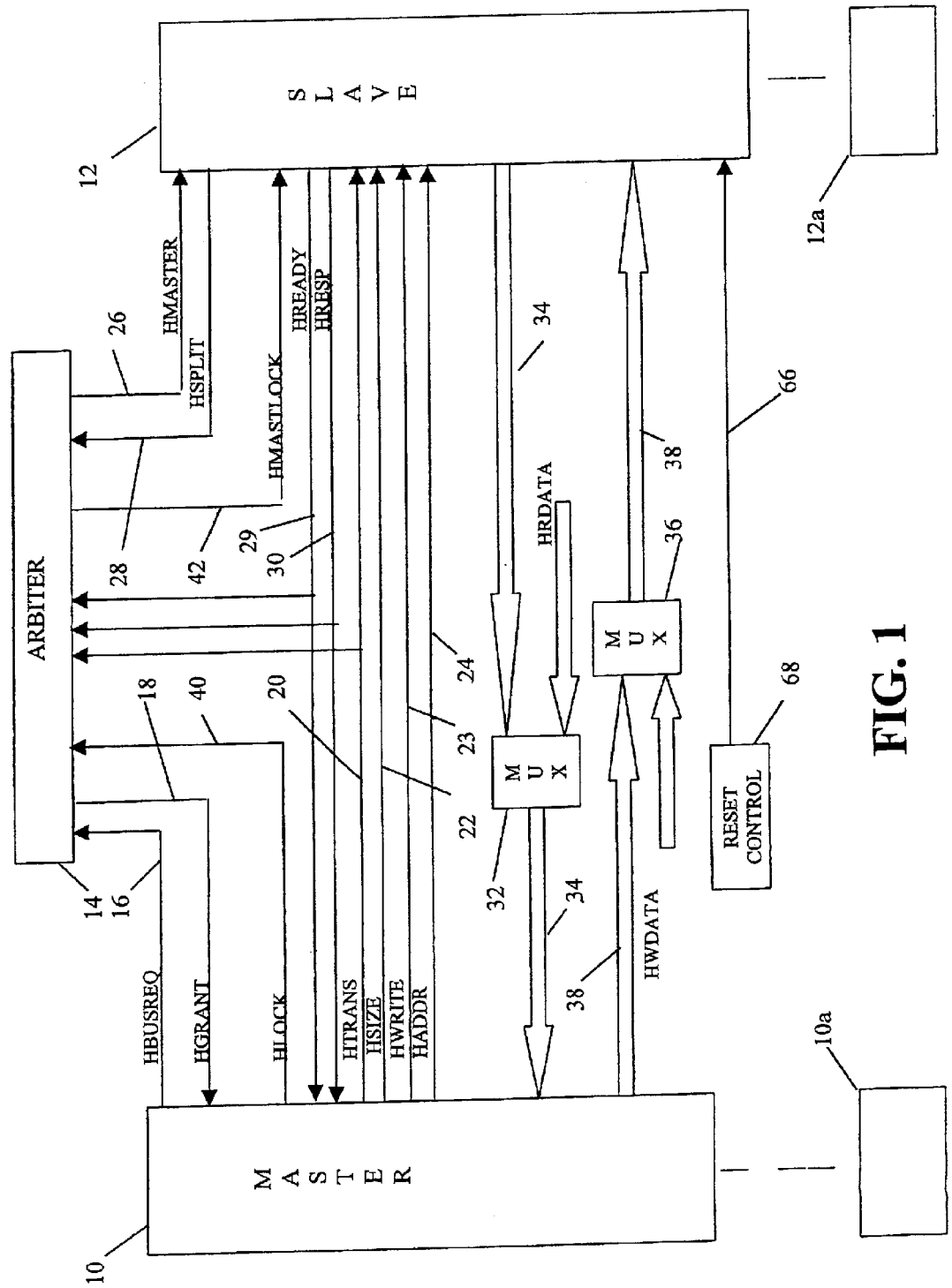
FIG. 1 is a block diagram of portions of a bus, illustrating a data flush control according to the present invention.

FIG. 1 illustrates portions of an Advanced High-performance Bus (AHB) design of an Advanced Microcontroller Bus Architecture (AMBA) bus from ARM Limited of Cambridge, England containing features of the present invention. A more detailed description of the AHB bus design may be found in *AMBA Specification* published by ARM Limited of Cambridge, England (1999), and particularly Chapter 3 thereof (pp. 3–1 to 3–58), incorporated herein by reference. This bus provides high performance, high clock frequency transfer between multiple bus master devices 10, 10a, etc. and multiple bus slave devices 12, 12a, etc., and is particularly useful in microprocessor chips, including single chip processors.

A master device 10 is a device that is capable of initiating a data transfer with a slave device 12 by providing address and control information. Examples of operations requiring data transfer between master and slave devices include read and write operations to read data from, or write data to, a peripheral memory device operated by the slave device. A slave device 12 is a device that responds to a command to perform the data transfer. The slave device ordinarily provides a return indicating the success, failure or waiting status of the data transfer.

In the bus illustrated in FIG. 1, data transfer operations between the master and slave devices are arbitrated by an arbiter 14, which is a device that ensures that only one master device 10 is allowed to initiate data transfers at a given time. The arbiter operates in accordance with an arbitration protocol that establishes a priority among the master devices, such as by an assigned rank or an allocation scheme based on usage.

The AHB bus illustrated in FIG. 1 has several features, including the ability of certain slave devices 12 to initiate a split of a transfer request from a master device 10 and the ability to handle locked transactions allowing a series of indivisible transfers between a master device and a slave device. When a slave device decides it cannot handle a commanded request, it may issue a split to block the requesting master device from the bus and idle the bus so that it becomes available to other master devices. When the slave device become ready to handle the transaction, the arbiter re-arbitrates the split master device to re-issue the command. Split transfers improve the overall utilization of the bus by delaying the data transfer phase.

A locked transaction holds the bus busy between the master and slave device to conduct a series of transfers.

In operation of the data bus system shown in FIG. 1, arbiter 14 is configured to receive an HBUSREQ signal via an individual line 16 from a respective master device 10, indicating that the respective master device 10 seeks access to the data bus. Arbiter 14 responds to the requests in an order established by its protocol, as modified by any split or retry operation, to issue an HGRANT signal via a respective line 18 to one of the requesting master devices. If, for example, there are sixteen master devices, there will be sixteen lines 16 on which each respective master device 10 notifies arbiter 14 that the respective master device desires use of the bus and there will be sixteen lines 18 on which access is granted. The arbiter protocol grants access to one and only one master device at a time.

When access is granted to a master device 10, the address phase commences with the requesting master device 10 sending each slave device 12 an HTRANS signal via bus 20, an HSIZE signal via bus 22, an HWRITE signal via bus 23 and an HADDR signal via bus 24. The HTRANS signal is also sent to arbiter 14. In addition, the master device sends an HLOCK signal to the arbiter. The HWRITE signal is a single bit representing whether the master device is requesting a read or a write operation; the HSIZE signal is a 3-bit code representing the size of the transfer; the HADDR signal is a 32-bit code representing the address of the location in a slave device where data are to be read or written; the HTRANS signal is a 2-bit code identifying the type of transfer (e.g., sequential, non-sequential, idle or busy); and the HLOCK signal is a bit indicating whether or not the master is performing a series of indivisible (locked) transactions.

Arbiter 14 asserts a master identification code, or tag, via bus 26 identifying the master device that is using the bus. This tag is sent to all of the slave devices via bus 26. In the case of a system with sixteen master devices, the master identification code is a 4-bit code representing the individual master device. Arbiter 14 also asserts an HMASTLOCK bit indicating that the transfer is or is not part of a locked transaction.

Each master transaction (HTRANS) on bus 20 generates a response from one of the slave devices 12, namely the slave device containing the address where the data are to be read or written. The response appears on buses 29 and 30 as a 1-bit HREADY signal and a 2-bit HRESP signal. An OKAY response (HRESP=(0,0) and HREADY=1) indicates that the previous command has been completed, for example that the write command and data transfer was accepted by the slave device or that read data are available on the HRDATA bus 34.

Upon receipt of a command from a master device, the slave device records the bus master number in a master ID queue. If the slave device decides it will handle the transaction it issues an OKAY response on HRESP bus 30. If the command is a write command, or if it is a read command and the read data are available on HRDATA bus 34, the slave device also asserts a bit on the HREADY bus 29 (HREADY=1) and the transaction is completed. Otherwise, the slave device de-asserts the HREADY bus 30 (HREADY=0) to STALL the bus. When read data become available on HRDATA bus 34, slave device 12 asserts a bit on HREADY bus 29 and the transaction is completed.

If the slave device decides it is not ready to handle the transaction, it issues a SPLIT response on HREADY bus 30 and HRESP bus 29 to mask the master device from the bus and idle the bus. Later, when the slave device becomes free to accept a command, it asserts a bit on HSPLIT bus 28 to unmask the split master device.

As shown in FIG. 1, actual transfer of data is performed directly between the slave device 12 and master device 10. A read transfer occurs when the slave device receives the master identification tag via bus 26 for the master device 10 for which it has retrieved data. At that time, the correct master device 10 has been granted access to the bus and the transfer takes place through multiplexer 32 on bus 34 to the correct master device. During the transfer, the slave device 12 issues an OKAY response on buses 29 and 30 notifying the arbiter and master device that the transfer has successfully occurred.

The present invention is directed to a technique of flushing or purging data of an incomplete operation for a master device 10 that is being reset. While the invention will be described in connection with read transactions, it is equally applicable to any transaction that returns data to the master device. Upon completion of the reset, the master device can re-initiate the transactions. Consequently, the master device can be reset and the slave device may be purged of pending transactions for that master device, without affecting the bus system as a whole or requiring reset of other devices.

Figure 2:
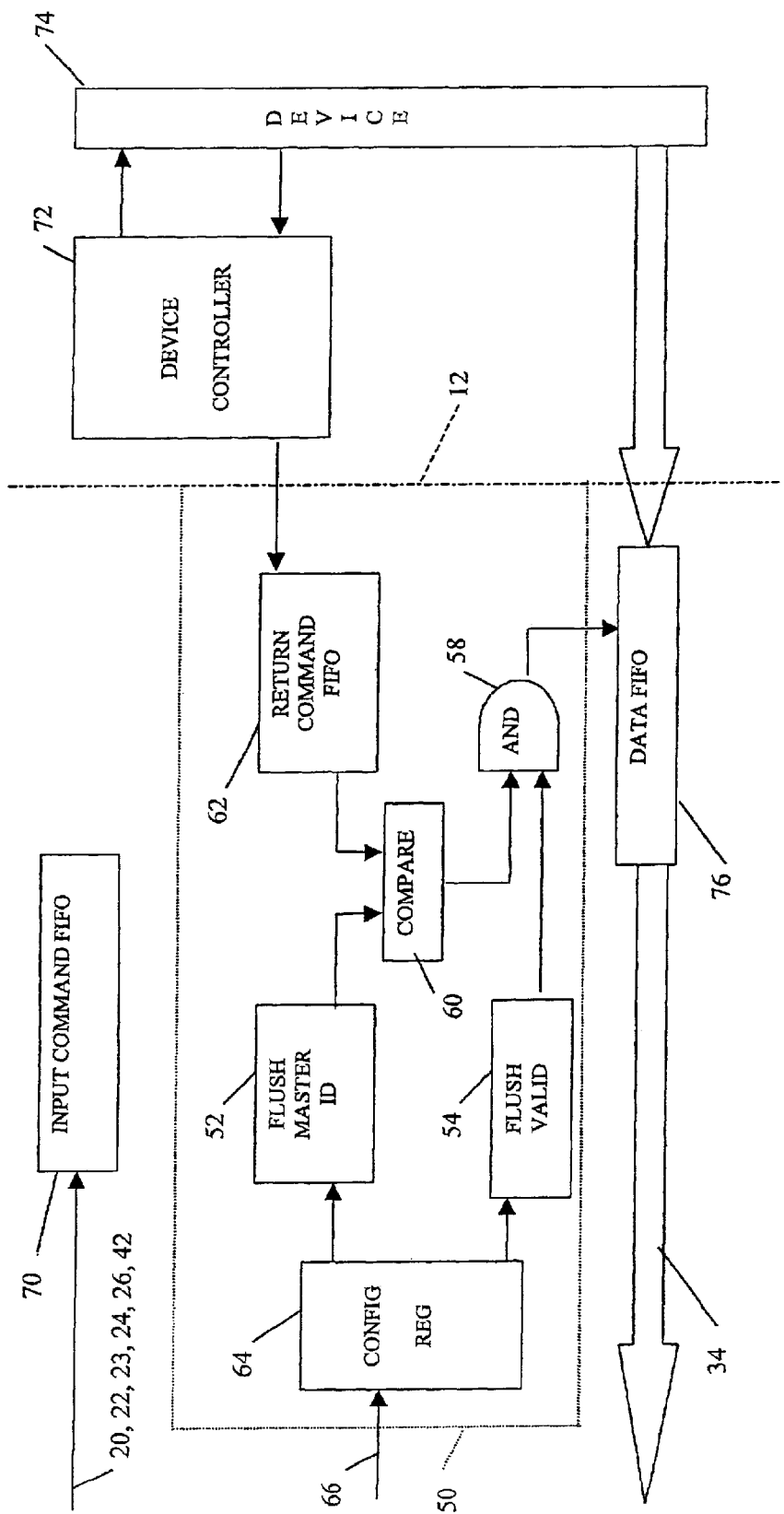
FIG. 2 is a functional block diagram of the output portion of a slave device for use in the bus illustrated in FIG. 1.

FIG. 2 is a functional block diagram illustrating output portions of a slave device 12 containing a dynamic buffer 50 in accordance with the present invention. Buffer 50 includes master ID register 52 and flush register 54 coupled to configuration register 64 that receives flush information via bus 66 from reset control 68 (FIG. 1). When a master device goes into a reset mode, reset control 68 supplies a master identification, or tag, onto bus 66 to identify the master device that is resetting to all slave devices. Reset control 68 also provides a flush valid flag via bus 66. It is preferred that a single reset control be separate from each master device. In some embodiments, where duplication of circuitry is not an issue, a reset control could be coupled directly to the master device to perform the same function for each individual master device.

Each slave device 12 stores the master identification in register 52 and stores the flush valid flag in register 54. Register 54 provides a flush master valid signal to a first input of AND gate 58 when register 54 contains a flush valid flag. The second input of gate 58 is coupled to the output of comparator 60, which compares the master identification in register 52 to the master identification in first-in, first-out (FIFO) register 62.

Slave device 12 includes an input command FIFO 70 that receives command from the data bus, such as via lines 20, 22, 23, 24, 26 and 42, shown in FIG. 1. FIFO 70 supplies input commands on a first-in, first-out basis to device controller 72 to execute the command on external device 74, such as an external memory or the like. In the case of a read transaction, data are returned from device 74 to a data FIFO 76 for return to the master device via bus 34. The identification, or tag, of the master device is also returned from device controller 72 to return command FIFO 62.

If a master device is reset, reset control 68 supplies the master device identification to register 52 in all slave devices. When read data for a transaction are returned from device controller 72 to data FIFO 76, the corresponding master device identification is returned to return command FIFO 62. Comparator 60 compares the returned command identification to the resetting master device identification in register 52. If the two identifications match, comparator 60 provides a signal to the second input of AND gate 58 whose output is coupled to data FIFO 76 to flush, or erase, the pending read data from FIFO 76. Thus, data read from device 74 are purged from the data FIFO. If the two identifications do not match, meaning the transaction is not for the master device being reset, the slave device operates in the normal manner to complete the read transaction with the proper non-resetting, master device.

The flush valid flag is set in register 54 at the same time that the master device identification is recorded in register 52. However, the flag is reset by a reset signal independent of a master identification. Consequently, when all of the reset master device become operating normally, reset control 68 provides a reset signal to all registers 54 to disable (invalidate) the flush valid flag. Any further matches between the identification in register 52 and a returned master identification in FIFO 62 are thereupon ignored and the slave device operates in its normal manner.

The present invention thus provides a flushing technique whereby pending transactions for reset master devices are flushed without affecting operation of the bus system between the slave devices and other master devices. Consequently, the entire bus system does not need to be reset during, or as a result of, reset of a master device, and transactions not affecting by the reset of a master device can be completed without interruption.

One feature of the invention as applied particularly to the AHB bus is that the invention does not require any changes to the controls and commands, including protocols, of the existing bus. Instead, an additional reset control 68, bus line 66 and dynamic buffer 50 accomplish the flushing of data for a resetting master device.

Although the present invention has been described with reference to preferred embodiments, workers skilled in the art will recognize that changes may be made in form and detail without departing from the spirit and scope of the invention. For example, while the invention is described in connection with read transactions, those skilled in the art will recognize that the flushing techniques may be applied to other transaction forms, particularly those that return data to the master device.

What is claimed is:

1. Apparatus for flushing data from a slave device intended for return to a master device in response to a flush command associated with the master device, the apparatus comprising:

a comparator for comparing an identification of the master device associated with the flush command to an identification of the master device associated with data pending for return by the slave device; and a gate responsive to the comparator for causing the slave device to flush data pending for return.

2. Apparatus according to claim 1, including a data bus coupling the slave device to a plurality of master devices, the slave device further including an input for storing a master device identification and a flush command associated with a master device initiating a flush operation and for which the slave device may be readying data for return in response to a prior command, and a register for storing an identification of a master device associated with data assembled for return to the master device in response to a prior command, the comparator being responsive to the input and register for identifying a match between the identification in the input and the identification in the register.

3. Apparatus according to claim 2, wherein the flush command includes a validity signal, the apparatus further including a validity register for storing a representation of the validity signal, the gate being responsive to the validity register and the comparator for causing the slave device to flush data.

4. Apparatus according to claim 3, wherein the slave device includes a data register for storing data to be returned to a master device for a command, the data register being responsive to the gate to flush data from the data register.

5. Apparatus according to claim 2, wherein the slave device includes a data register for storing data to be returned to a master device for a command, the data register being responsive to the gate to flush data from the data register.

6. Apparatus according to claim 1, wherein the slave device includes a data register for storing data to be returned to a master device for a command, the data register being responsive to the gate to flush data from the data register.

7. Apparatus according to claim 1, including a reset control associated with the master device for issuing the flush command upon reset of the master device.

8. Apparatus according to claim 7, including a data bus coupling the slave device to a plurality of master devices, the slave device further including an input for storing a master device identification and a flush command associated with a master device initiating a flush operation and for which the slave device may be readying data for return in response to a prior command, and a register for storing an identification of a master device associated with data assembled for return to the master device in response to a prior command, the comparator being responsive to the input and register for identifying a match between the identification in the input and the identification in the register.

9. Apparatus according to claim 8, wherein the flush command includes a validity signal, the apparatus further including a validity register for storing a representation of the validity signal, the gate being responsive to the validity register and the comparator for causing the slave device to flush data.

10. Apparatus according to claim 9, wherein the slave device includes a data register for storing data to be returned to a master device for a command, the data register being responsive to the gate to flush data from the data register.

11. Apparatus according to claim 8, wherein the slave device includes a data register for storing data to be returned to a master device for a command, the data register being responsive to the gate to flush data from the data register.

12. Apparatus according to claim 7, wherein the slave device includes a data register for storing data to be returned to a master device for a command, the data register being responsive to the gate to flush data from the data register.

* * * * *